Oct. 29, 1963
E. FELIX
3,108,509
DEPOSITING AND STACKING DEVICE FOR SHEET
MATERIAL, ESPECIALLY VENEER BOARDS
Filed April 11, 1960
5 Sheets-Sheet 1
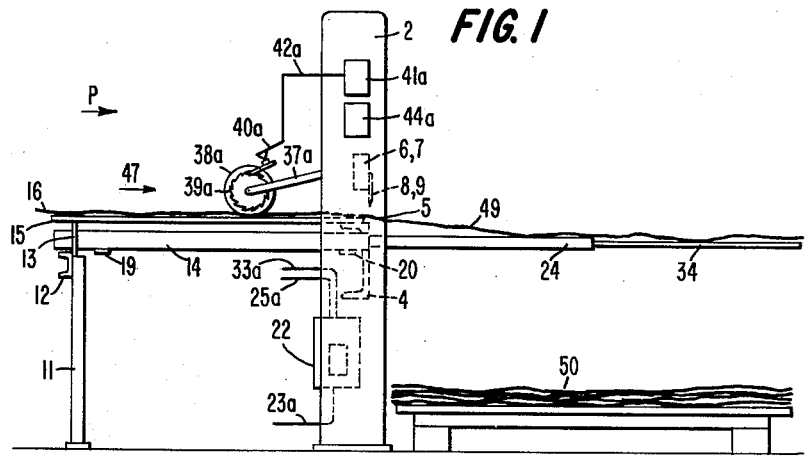
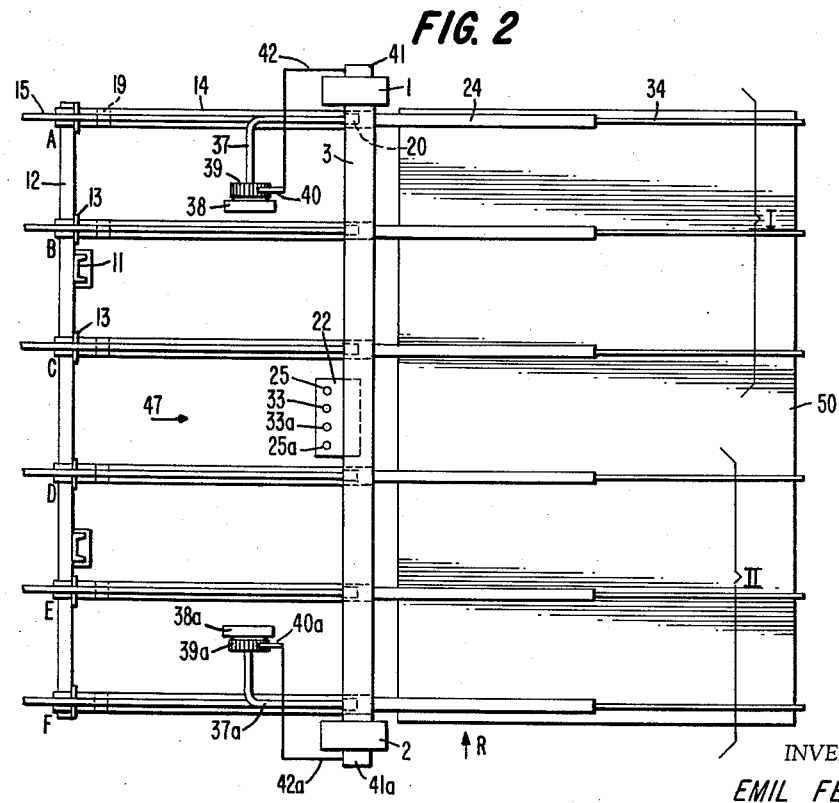
INVENTOR
EMIL FELIX
BY

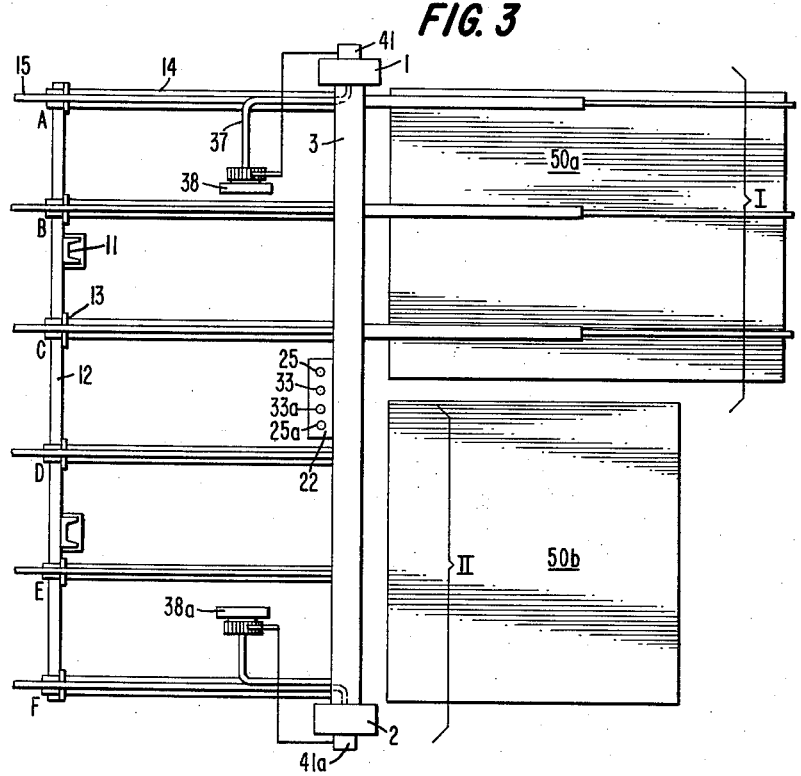
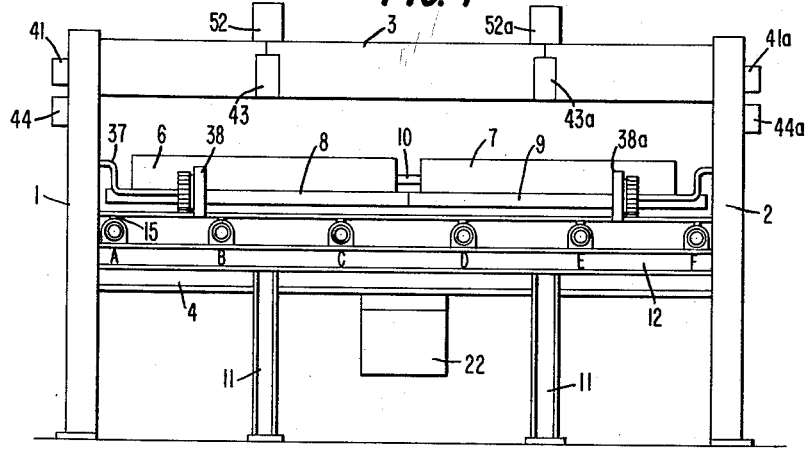

Oct. 29, 1963

E. FELIX 3,108,509

DEPOSITING AND STACKING DEVICE FOR SHEET
MATERIAL, ESPECIALLY VENEER BOARDS

Filed April 11, 1960

INVENTOR
*EMIL FELIX*

BY

Oct. 29, 1963

E. FELIX 3,108,509

DEPOSITING AND STACKING DEVICE FOR SHEET
MATERIAL, ESPECIALLY VENEER BOARDS

Filed April 11, 1960

INVENTOR
EMIL FELIX

BY

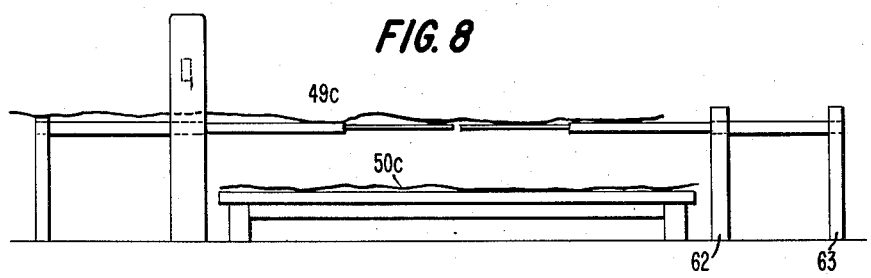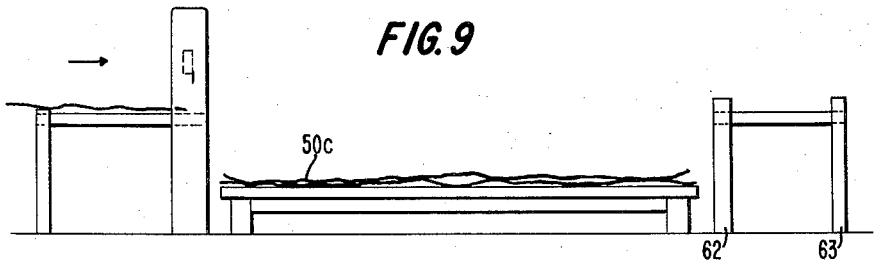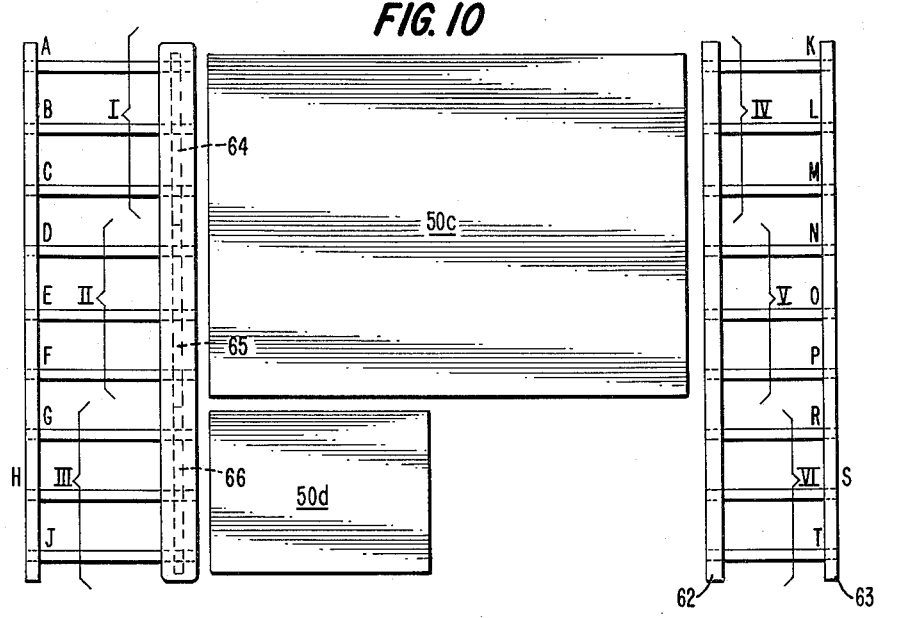

United States Patent Office 3,108,509
Patented Oct. 29, 1963

3,108,509
DEPOSITING AND STACKING DEVICE FOR SHEET MATERIAL, ESPECIALLY VENEER BOARDS
Emil Felix, Brugg, Switzerland, assignor to Mueller A.G., Brugg, Switzerland
Filed Apr. 11, 1960, Ser. No. 21,283
Claims priority, application Switzerland Apr. 13, 1959
4 Claims. (Cl. 83—81)

The present invention relates to a depositing and stacking device for sheet material, especially veneer boards and plywood boards, which device may be used in connection with a cutting machine immediately preceding said device.

When making plywood, it is known to compose veneer strips on transverse gluing machines to endless bands or belts and then to cut such bands or belts to size for further processing the same. To this end, cutting machines are known which make it possible selectively to cut either wide veneer bands in a single cut, or over the entire cutting width to cut at least two relatively narrow veneer bands independently of each other to different sizes. The problem of completely automatically depositing the thus cut veneer boards immediately following the cutting operation and to stack the same as for instance on lifter trucks or other stacking devices, has not been satisfactorily solved prior to the present invention.

Devices are known which grasp the cut boards from the side and by laterally turning the grippers or unloaders drop the said boards upon stacked material therebelow. Such devices, however, cannot be employed for wide veneer bands because such wide boards deflect and would therefore be liable to damage if handled by the said known devices. Furthermore, if such devices are employed in connection with cutting machines which are able at the same time to cut more than one veneer board or strip there exists the drawback that considerable space is required between the two boards to be deposited in order to be able to move the grippers or unloaders in lateral direction.

Most of other heretofore known depositing and stacking devices have the drawback that the stacking devices or certain parts thereof as for instance struts, traverses etc. continuously extend into the working area, also when the cutting machine is not in operation. This space is, therefore, always blocked and cannot be used for other purposes. If on the delivery side of the cutting machine there are present protruding or overhanging parts spaced from the ground and pertaining to a depositing device, there exists the drawback that the lifter trucks customary in such plants cannot move freely.

It is, therefore, an object of the present invention to provide a lifting and stacking device which will overcome the above mentioned drawbacks.

It is another object of this invention to provide a depositing and stacking device for sheet material, especially veneer boards, which will be highly effective and will not interfere with the working area around the depositing and stacking device.

These and other objects and advantages of the invention will appear more clearly from the following specification in connection with the accompanying drawings, in which:

FIG. 1 illustrates a side view of a first embodiment of a depositing and stacking device according to the invention, said view being seen in the direction of the arrow R in FIG. 2.

FIG. 2 is a top view of the arrangement of FIG. 1 for a one-web operation, the cut material being omitted, and the stack below moved-out telescopic pipes being indicated.

FIG. 3 illustrates a top view of the arrangement of FIG. 1 for a two-web operation, telescopic pipes being partially moved out and partially drawn back while the cut material is omitted and both stacks are indicated.

FIG. 4 is an end elevation of FIG. 1 as seen in the direction of the arrow P in FIG. 1.

Figure 5:
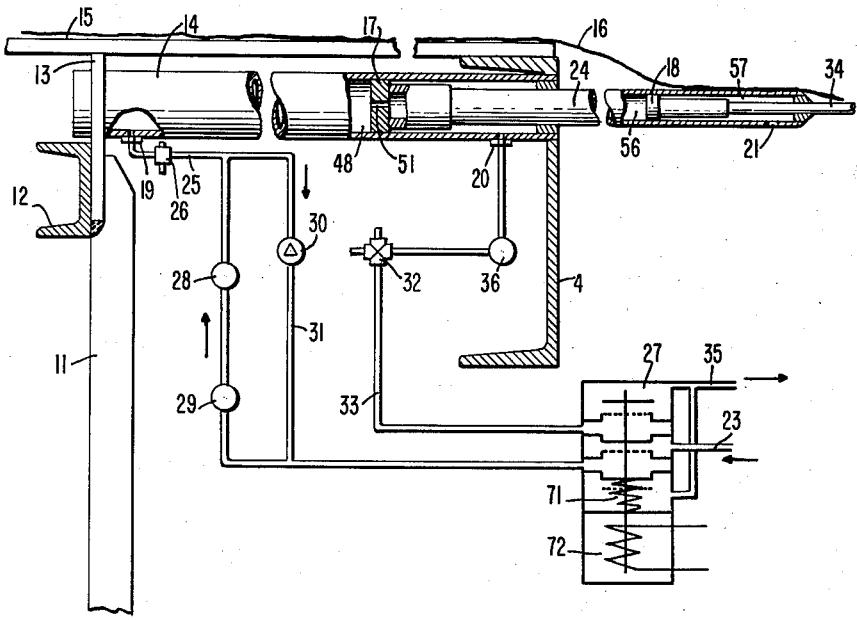
FIG. 5 is a partial section through a telescopic pipe in the moving-out stage.
Figure 6:
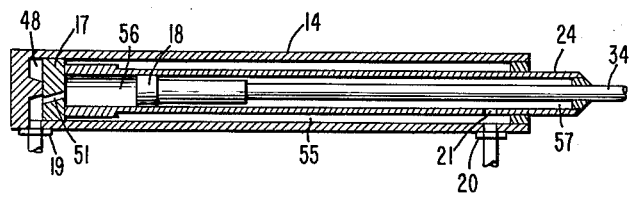
FIG. 6 is a partial section through a telescopic pipe during its return movement.

FIG. 8 diagrammatically illustrates a further embodiment of a depositing and stacking device according to the invention, the telescopic pipes used in connection therewith being shown in moved-out condition.

FIG. 9 shows the arrangement of FIG. 8 but with the telescopic pipes in returned condition.

FIG. 10 is a top view of FIG. 8 in which the cut material has been omitted and the stack has been indicated.

General Arrangement

The depositing and stacking device according to the present invention is characterized primarily by at least two pressure fluid operable telescopic pipes preferably having their axes arranged in a horizontal plane and parallel to each other and the direction of movement of the cut material, said telescopic pipes when moving out or in moved-out condition serving directly as support for the cut material being delivered and when returning to their moved-in condition releasing and thereby depositing the cut boards on a stacking device or the like which may for instance be arranged directly therebelow.

Structural Arrangement

Referring now to the drawings in detail and FIGS. 1 to 7 thereof illustrating a first embodiment of a depositing and stacking device according to the present invention, this device will be described in connection with a veneer or size cutting shears which have been indicated diagrammatically only inasmuch as said shears do not form a part of the present invention. The said shears are provided with lateral stands 1 and 2 and with upper and lower traverses 3 and 4 respectively. These traverses carry the fixedly arranged lower knife 5. The upper knife beams 6 and 7 (FIG. 4) which are actuated by the upper traverse 3 through the intervention of means not shown in the drawings, are each carrying an upper knife 8 and 9. The upper knife beams 6 and 7 may, depending on the particular type of employment of the shears, be used selectively either individually or independently of each other, or when coupled together by a mechanical locking device 10 may be actuated simultaneously. Properly spaced from the entrance side (see arrow 47 of the veneer shears) there is arranged a traverse 12 mounted on supports 11. Traverse 12 is provided with fish plates 13 supporting one end of six telescopic pipe cylinders 14, the other ends of which extend through the lower traverse 4 of the veneer shears. Directly above each of the six telescopic pipe cylinders 14 are arranged supporting bars 15 having one end thereof respectively connected to fish plates 13 and having their other ends connected to the lower traverse 4. The veneer band 16, which moves in the direction of the arrow 47 and is delivered by a seam gluing machine (not shown), is adapted to slide over the supporting bar 15.

The telescopic pipes, which are preferably all of the same design, comprise a telescopic pipe cylinder 14 (FIGS. 5 and 6) with a cylinder chamber 48 having reciprocably mounted therein a piston 17 with a hollow piston rod 24. In the bore 56 of said piston rod 24 there is longitudinally reciprocably mounted a further piston 18 with a piston rod 34.

One end of cylinder 14 is provided with a connection 19 while the other end is provided with a connection 20 for alternately feeding a pressure fluid into or withdrawing the same from cylinder 14. The wall of the hollow piston rod 24 is provided with a bore 21 for the admission and withdrawal of pressure fluid. The bottom of piston 17 is provided with a bore 51 so that pressure fluid from chamber 48 may pass into chamber 56 and vice versa.

The lower traverse 4 of the veneer shears or veneer cutting machine has arranged thereon a control box 22 into which leads a pressure fluid supply conduit 23 conveying a pressure fluid from a supply source as for instance an air compressor (not shown in the drawings). As will be evident from the diagram or circuit illustrated in FIG. 7, three of the telescope pipe assemblies 14, 24, 34 indicated by the characters A, B and C are grouped together to a first group I while three other telescope assemblies 14, 24, 34 and indicated by the letters D, E, F are grouped together to a second group II.

Figure 7:
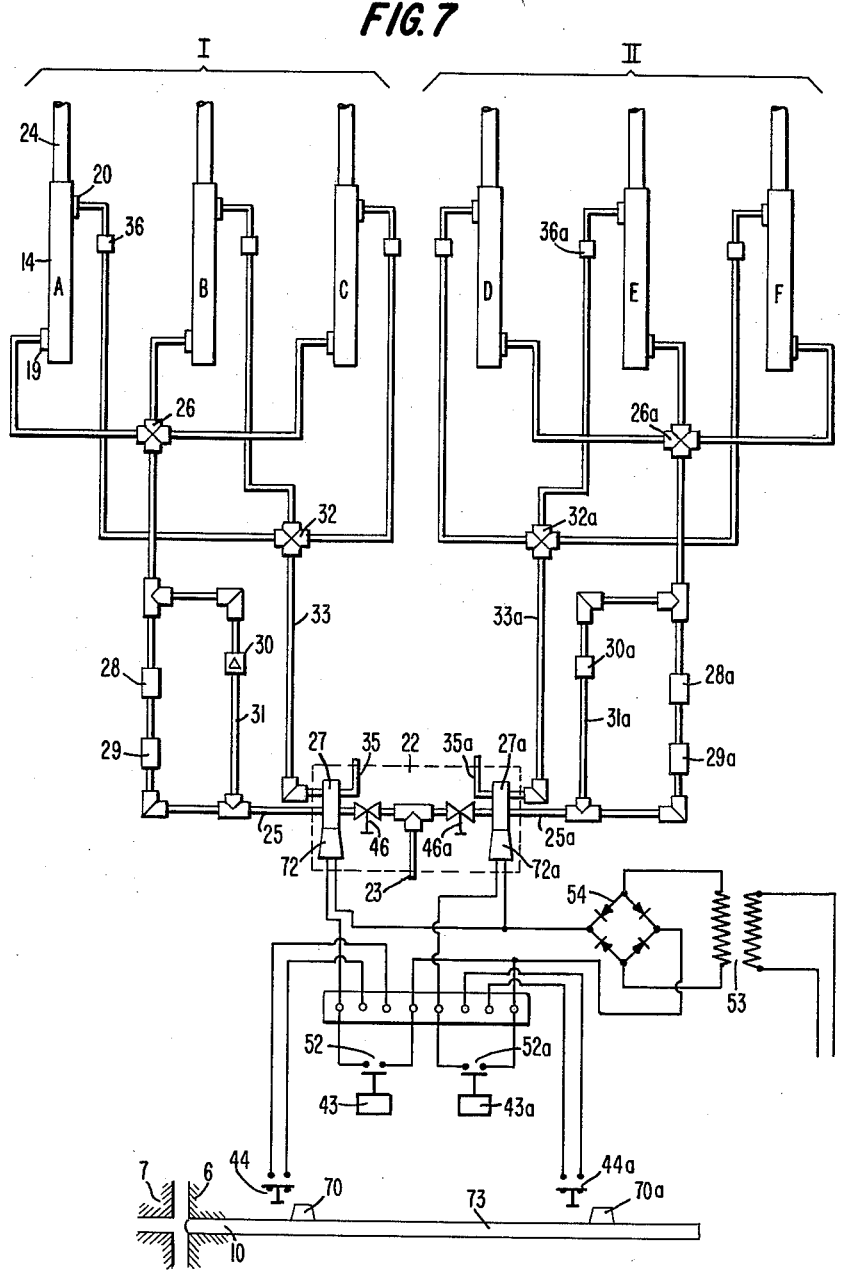
FIG. 7 represents a pipe and control diagram for use in connection with the arrangement of FIG. 1.

The control box 22 which has been indicated diagrammatically only in FIG. 7, is for each of the groups I and II designed as an electromagnetically (72 and 72a respectively) operable control valve 27 and 27a respectively. Each of the said control valves 27, 27a shown schematically in FIG. 5 communicates with a pipe connection 23 for supplying pressure fluid, with a discharge conduit 35, 35a respectively leading into the open, and with a conduit 25, 25a, respectively and 33, 33a respectively leading to the telescopic pipes. Throttle valves 29, 29a and a pressure reducing valve 28, 28a are respectively arranged in conduits 25, 25a which communicate with the connections 19 of the telescopic pipes A, B, C, and D, E, F respectively through connecting pieces 26 and 26a respectively. The circuit shown in FIG. 7 furthermore comprises by-pass conduits 31, 31a, by-passing valves 29, 29a and 28, 28a. Said by-pass conduits have arranged therein a check valve 30 and 30a respectviely which permit pressure fluid to flow only in the direction from the telescopic pipes A, B, C and D, E, F to the control valves 27, 27a. Conduits 33 and 33a respectively communicate with the connections 20 of the respective telescopic pipes A, B, C and D, E, F through connecting members 32 and 32a respectively. Each of conduits 33 and 33a has arranged therein a throttle 36 and 36a respectively for controlling the speed of the return movement of the telescopic pipes which may move relatively fast. When the electromagnet 72 and 72a respectively is in de-energized condition, the two control valves 27, 27a may for instance by spring means 71 and 71a respectively be adjusted in such a way as shown in FIG. 5 in full lines that on one hand pressure fluid will be able to escape from conduit 23 into pipe lines 25 and 25a respectively while on the other hand pressure fluid may pass from conduits 33, 33a through conduits 35 and 35a into the atmosphere. If the valves 27, 27a are in their other controlling position shown in FIG. 5 in dotted lines into which they are moved by a magnetic effect of 72 and 72a respectively, pressure fluid will pass from conduit 23 to conduits 33, 33a, while pressure fluid from conduits 25, 25a and 31, 31a will be able to escape into the atmospheer through conduits 35 and 35a.

By means of throttle valves 29 and 29a, the moving-out speed of the telescopic pipes may be controlled. The pressure fluid reducing valves 28, 28a have the purpose of reducing the pressure in chambers 48 and 56 in order to be able faster to initiate the return movement of the telescopic pipes which follows the cutting operation.

As illustrated in FIGS. 1 and 2, each stand 1 and 2 has mounted thereon a supporting arm 37 and 37a respectively with a measuring wheel 38, 38a adapted to roll on the cut foil, i.e. the cut veneer band. Coupled to the measuring wheel 38, 38a are cam discs 39 and 39a respectively and switch contacts 40, 40a respectively. Control current conductors 42, 42a respectively lead to impulse repeating mechanisms 41, 41a by means of which the contacts or impulses produced by the measuring roller 38, 38a are aided whereupon in response to the obtainment of a predetermined number of contacts or impulses the cutting movement of the veneer shears is initiated for instance by actuation of a switch 44, 44a. Time delay means 43, 43a respectively of known design for actuating a switch 52, 52a respectviely are connected to the control conduit of the switches 44 and 44a respectively. The time delay means 43, 43a have the purpose of delaying the reversing of valves 27, 27a, i.e. the interruption of the magnetic flow in the coils 72, 72a of said valves, until the telescopic pipe has been retracted and thus the cut-off veneer sheet 49 has been deposited upon the stack 50. This means 43, 43a act in such a way that, on one hand they tend to open the swtiches 52, 52a immediately after having them closed by means of actuation of the switches 44, 44a. Adjustable delay means, however, retard the opening as described later on.

The pressure fluid supply line 23 has interposed therein two cut-off valves 46, 46a by means of which selectively one or the other of the two telescopic pipe groups I and II or both together may be made effective if this should be required for the operation of the device. In FIG. 7, 53 is a transformer, and 54 is a rectifier for the control circuit.

Operation

The depositing and stacking device according to the invention as described above will operate in the following manner. A non-illustrated seam gluing machine furnishes the endless band 16 of glued veneer and does so at a constant or intermittent feeding movement in the direction of the arrow 47 (FIGS. 1 and 2) over the bar 15 toward the veneer cutting machine or shears.

As indicated above, two different types of operations are possible with the veneer shears of FIGS. 1 to 4 and 7 with separately employable upper knives 8 and 9. The depositing device according to the invention is, therefore, designed accordingly. As will be evident from the above description, according to the first embodiment (FIG. 7) six telescopic pipes are sub-divided in two groups namely group I with the telescopic pipes A, B and C and group II with the telescopic pipes D, E and F. If according to one possible way of operation, as shown in FIG. 2, a veneer band 6 is to be cut from the entire available cutting width by the veneer cutting machine and if the sections 49 are, for instance, to the stacked or deposited on a palette, the two telescopic pipe groups I and II will be coupled together. To this end, upon pushing to the left a bar 73 with two cams 70 and 70a diagrammatically shown in FIG. 7 interconnects the two switches 44 and 44a, and the lock 10 diagrammatically indicated in FIG. 4 and being a part of said bar 73 and pertaining to the two upper knife beams 6 and 7, is made effective so that the said two beams can be moved only together and simultaneously.

These means will result in an automatic mutual coupling of the locking means 10 with the switches 44 and 44a. By means of the advanced veneer band 16, the measuring wheel 38 resting on band 16 will together with the cam disc 39 be rotated thereby producing impulses at contact 40 which are conveyed through conductors 42 to the impulse repeating mechanism 41 where after a predetermined number of impulses, depending on the desired length of the section 49, switches 44 and 44a are electrically actuated for initiating a cutting movement of the shears. At the same time the time delay means 43 and 43a are started. After the cutting movement of the shears has been initiated, the impulse repeating mechanism 41 is automatically reset for its next cycle.

When the feeding line 23 contains fluid under pressure, and when the switches 44 and 44a (FIG. 7) are open, the control members in valves 27 and 27a occupy a position shown in full lines in FIG. 5 in which the pipe lines 25 and 25a are under pressure so that pressure fluid is able to pass through connections 19 into the cylinder chambers 48 and through bores 51 into chambers 56. Thus, all telescopic pipes are in moving-out or moved-out position.

If, however, switch 44, 44a has been controlled by the impulse repeating mechanism 41, 41a so as to initiate a cut of the veneer cutting machine or shears, following the effected cut, the upper knives 8 and 9 have quickly to be lifted again in order to permit the continuously fed veneer band 16 coming from the seam gluing machine to be able further to move through the veneer shears. The time relays 43, 43a will be started by the switches 44, 44a and will in their turn actuate switches 52, 52a and will thus close the magnetic flow in the coils 72 and 72a respectively of the control valves now pass into conduits 33, 33a and through connections 20 into chambers 55 whereby the pistons 17 with the hollow piston rods 24 will return into the cylinders 14. After the pistons 17 have arrived in the neighborhood of their return end position, also the openings 21 will be located in chamber 55 so that pressure fluid can also pass into chambers 56. As a result thereof, also pistons 18 with their piston rods 34 will return to their starting position. The pressure fluid from chambers 56 will escape through bores 51 into chambers 48 and through connections 19 into conduits 25, 25a in which position the by-pass conduit 31, 31a with check valve 30, 30a will release the return flow through valve 27, 27a into the discharge conduit 35, 35a and thereby to the atmosphere.

Adjustable time delay means (not shown) arranged in the time relays 43, 43a hold the switches 52, 52a and thus the magnetic flow in the coils 72, 72a of valve 27, 27a for such a time interval until the telescopic pipes have arrived in their return end position. It is only then that the current in switches 52 and 52a in interrupted as a result of which valves 27, 27a (FIG. 5) will be reversed. However, in the meatime the veneer band 16 has been advanced and the again moved-out telescopic pipes will again support the advanced veneer band section. This cycle is continuously repeated.

If according to the other way of operation of the veneer shears and thus of the depositing device, as illustrated diagrammatically in FIG. 3, at the same time two veneer bands 16a and 16b having a total width corresponding to the maximum of the usable width of the veneer shears, are to be cut to size independently of each other and are to be deposited while the length of the sections on the stacks 50a and 50b may be different, the locking device 10 is disconnected so that each of the two upper knife beams 6 and 7 will be able to work independently of the other.

In FIG. 3, where for the sake of clarity the cut material has been omitted, the telescopic pipes of group I occupy their moved-out position, whereas the telescopic pipes of group II are in their returned or retracted position. One measuring wheel each 38, 38a respectively moves on the two veneer bands 16a, 16b, and the control of each side of the veneer shears is effected completely independently of the other, i.e. two working forces may work independently of each other. The two stacks 50a and 50b have been diagrammatically indicated.

However, it is also possible to work with one of the two telescopic pipe groups I or II only. In such instance only the corresponding shut-off valve 46, 46a remains open, whereas the telescopic pipes not pertaining to the employed group will remain in their returned or retracted position.

With the embodiment according to FIGS. 1 to 7, the length of the boards to be deposited is limited by the dimensions of the freely protruding telescopic pipes. However, in order also to be able to deposit and stack boards of greater length, a further embodiment according to FIGS. 8 to 10 is provided. Over the arrangement shown in FIGS. 1 to 7, according to FIGS. 8 to 10 additional telescopic pipes are provided and arranged as an image to the telescopic pipes of FIGS. 1 to 7. These additional telescopic pipes are connected similar to those of FIGS. 1 to 7 to a front traverse 62 and a rear traverse 63. As will be evident from FIG. 10, such a device can be employed particularly economically in connection with a veneer or size cutting machine in which an upper cutting knife is employed which extends over the entire cutting width of the shears and may be used selectively as a unit or in desired combinations, i.e. sub-divided into two or three independently operable sectional upper knives 64, 65, 66.

According to FIG. 10, the telescopic pipes on the veneer shears side A, B, C are combined to a group I and the telescopic pipes D, E, F are combined as group II, whereas the pipes G, H, J are combined to a group III. The telescopic pipes K, L, M arranged opposite the said telescopic pipes are grouped as group IV, and the telescopic pipes N, O, P are combined to group V, whereas telescopic pipes R, S, T are combined to group VI. The axes of the telescopic pipes facing each other such as A and K or B and L, etc. extend parallel to each other. In the horizontal and vertical planes, the axes of the telescopic pipes may be different from each other.

The control of the outward and return movement of the oppositely located telescopic pipes or telescopic pipe groups is effected in the manner described above. In this connection, the pipe connections of oppositely located groups are coupled to each other so that the depositing of the veneer board sections 49 will be brought about by the simultaneous withdrawal of the respective telescopic pipes.

FIG. 10 diagrammatically illustrates a possibility of operation according to which simultaneously but completely independently of each other two veneer bands are processed namely on one hand a wide veneer band and a narrow veneer band. The wide veneer band has been cut by the upper knives 64 and 65 in veneer shears 61 into boards of great length and has been supported by the co-operating telescopic pipe groups I, II and IV and V and has been deposited as stack 50c. The narrow veneer band has been cut by the upper knife 66 in boards of short length which are supported by the telescopic pipes G, H, J of group III and has been deposited as stack 50d. In this instance the telescopic pipes R, S, T of group VI are not employed. As mentioned above, also other ways of operation are possible.

As will be seen in FIGURE 7, the telescopic pipes at one side can be connected with the corresponding telescopic pipes on the other side by utilizing cross connections between the respective groups of telescopic pipes, which cross connections are indicated in dotted lines in FIGURE 7 and which bear the reference numerals 26b, 26c, 33b, and 33c. In this manner the telescopic pipes on both sides expand and contract together.

The feature that all telescopic pipes which are not required at the respective time of operation will be returned into the cylinders 14 has the great advantage that the respective space is available for other purposes.

It is, of course, to be understood that the present invention is, by no means, limited to the particular constructions shown in the drawings but also comprises any modifications within the scope of the appended claims.

What I claim is:

1. In a depositing and stacking device for sheet material, especially veneer boards, which is adapted to receive cut sheet material moving thereto in a continuous flow: frame means, at least four telescopically arranged expandable and contractable supporting means supported by said frame means and spaced from each other in a direction transverse to the longitudinal axes of said telescopically arranged supporting means, said telescopically arranged supporting means forming a part of the path of movement of said cut sheet material and having their longitudinal axes extending in the direction of movement of said cut sheet material, said telescopically arranged supporting means being sub-divided in at least two groups extending in the direction of the width of the path of movement of the cut sheet material to be supported thereby, and means operatively connected to the respective groups for expanding and retracting the respective groups without movement of the others of the respective groups.

2. In combination: a cutting machine comprising cutting means for cutting sheet material while it is fed along a certain path, frame means, a plurality of fluid operable telescopic means in a horizontal plane supported by said frame means and forming part of the path of movement of said cut sheet material and having their longitudinal axes parallel and extending in the direction of movement of said cut sheet material, said telescopic means being expandable for receiving and supporting cut sheet material and also being contractable for discharging cut sheet material supported thereby, actuating fluid conveying conduit means leading to said telescopic means, control means associated with said cutting means and said conduit means and operable in response to the operation of said cutting means for controlling the flow of fluid to and from said telescopic means to thereby control the expansion and contraction of said telescopic means, and additional control means arranged in said conduit means between said first mentioned control means and said telescopic means for controlling the rate of fluid flow therein and thereby controlling the speed of movement of said telescopic means, said control means being operative to cause retraction of said telescopic means immediately following each cutting operation of said cutting means thereby to drop each cut off piece of material from the telescopic means to a stacking station, and said control also being operable immediately thereafter to cause expansion of said telescopic means for receiving the next piece of material.

3. In a depositing and stacking device for sheet material, especially veneer boards, which is adapted to receive cut sheet material moving thereto in a continuous flow: frame means, a plurality of telescopic means supported by said frame means and arranged in groups mounted opposite to each other, the telescopic means of each group being spaced from each other in a direction transverse to the longitudinal axes of said telescopic means, and the axes of telescopic means arranged opposite to each other being respectively in alignment with each other, said telescopic means forming a part of the path of movement of said cut sheet material and having their longitudinal axes extending in the direction of movement of said cut sheet material, said telescopic means of each group being expansible and contractable in the respective opposite direction of their expansion and contraction of the telescopic means of the other group whereby when the telescopic means are expanded they form a substantially continuous support for pieces of cut material and when they are contracted an opening is provided through which said piece of cut material will drop to a stacking station, and means operatively connected to said telescopic means for expanding the same to receive and support each individual piece of the respective oncoming cut sheet material and for subsequently contracting said telescopic means following the delivery of each individual piece of material to thereby withdraw the support formed by said telescopic means from underneath each respective piece of the cut sheet material thereon to thereby unload and stack the latter.

4. An arrangement according to claim 3, which includes control means common to oppositely located telescopic means for common control thereof.

References Cited in the file of this patent

UNITED STATES PATENTS

| | | |
|---|---|---|
| 641,027 | Martin | Jan. 9, 1900 |
| 1,089,834 | Goldberg | Mar. 10, 1914 |
| 2,414,059 | Powers | Jan. 7, 1947 |
| 2,637,394 | Fey | May 5, 1953 |
| 2,765,167 | Maher | Oct. 2, 1956 |
| 2,906,530 | Matthews | Sept. 29, 1959 |
| 2,921,561 | Sendoyras | Jan. 19, 1960 |
| 2,923,276 | Flick | Feb. 2, 1960 |
| 2,950,108 | Golding | Aug. 23, 1960 |